Sept. 9, 1952  G. R. FIELDS ET AL  2,610,087
DUMP TRAILER
Filed Oct. 12, 1948  4 Sheets-Sheet 2

Glenn R. Fields
Samuel S. Bumpus
INVENTORS.

BY Clarence A. O'Brien
and Harvey B. Jacobson
Attorneys

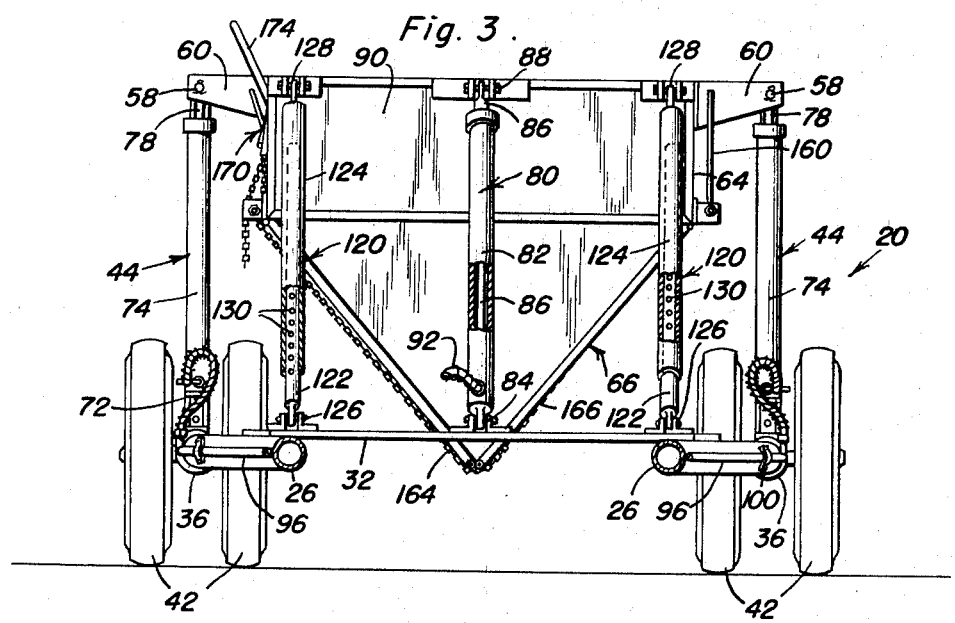
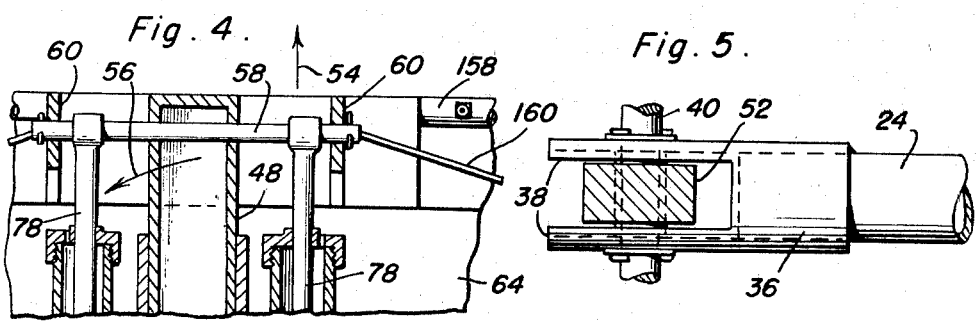
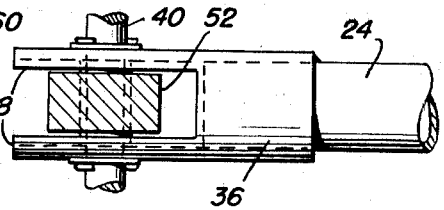
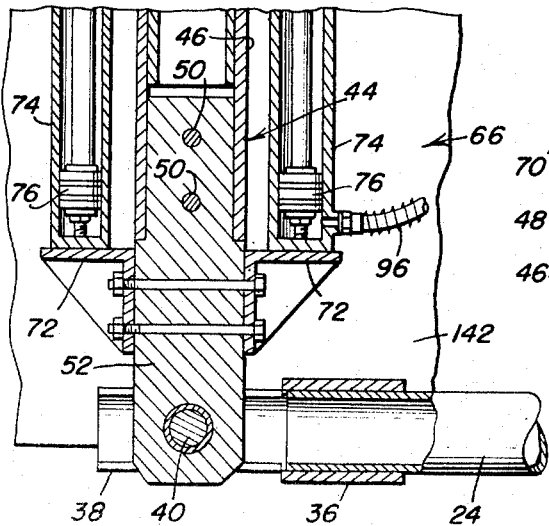

Sept. 9, 1952　　　　　G. R. FIELDS ET AL　　　　　2,610,087
DUMP TRAILER
Filed Oct. 12, 1948　　　　　　　　　　　　　　4 Sheets-Sheet 4
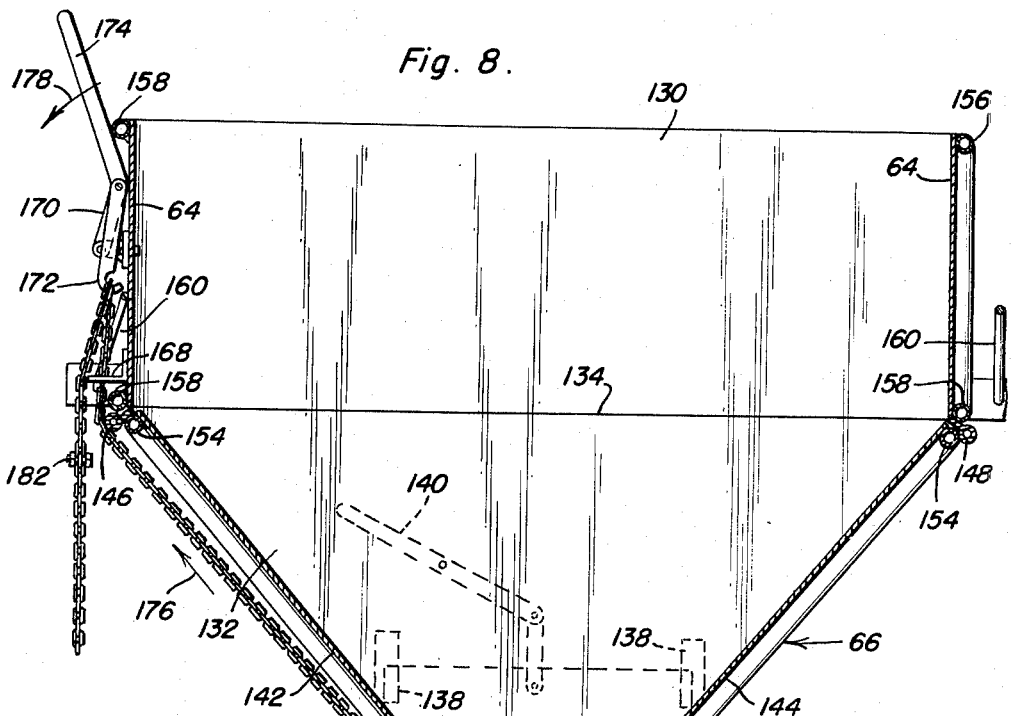
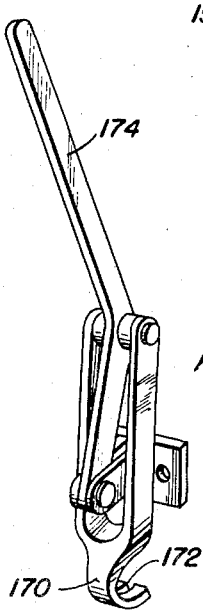
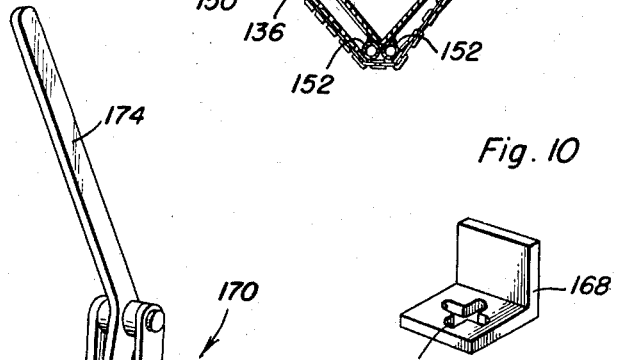
Inventors
Glenn R. Fields
Samuel S. Bumpus
Clarence A. O'Brien
and Harvey B. Jacobson
Attorneys Patented Sept. 9, 1952

2,610,087

UNITED STATES PATENT OFFICE 2,610,087

DUMP TRAILER

Glenn R. Fields, Gem, and Samuel S. Bumpus, Eureka, Kans.

Application October 12, 1948, Serial No. 54,012

1 Claim. (Cl. 298—22)

This invention relates to new and useful improvements and structural refinements in dump trailers, and the principal object of the invention is to facilitate convenient and expeditious handling of grain, silage, coal, gravel, and other similar material, matters being so arranged that by employing the instant trailer, the load may be dumped by simply tilting the trailer body rearwardly, or alternatively, the trailer body may be elevated and doors in the bottom thereof opened, so that successive loads may be dumped or deposited one on top of another.

An important feature of the invention, therefore, resides in the provision of means for selectively tilting the trailer body rearwardly and elevating the same in a vertical direction preparatory to the dumping operation.

Another feature of the invention resides in the provision of a self-contained hydraulic unit on the trailer frame for selectively tilting or elevating the trailer body.

A still further feature of the invention lies in the provision of means for controlling the closing and opening of the body doors and gates.

Important advantages of the invention lie in its simplicity of construction, convenience of operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 3 is a cross-sectional view, taken substantially in the plane of the line 3—3 in Figure 1;

Figure 4 is a cross-sectional view, taken substantially in the plane of the line 4—4 in Figure 2;

Figure 5 is a cross-sectional view, taken substantially in the plane of the line 5—5 in Figure 1;

Figure 6 is a cross-sectional view, taken substantially in the plane of the line 6—6 in Figure 2;

Figure 7 is a fragmentary end elevational view showing the sliding gate in the rear end of the trailer body;

Figure 8 is a cross-sectional view, taken substantially in the plane of the line 8—8 in Figure 1;

Figure 9 is a perspective view of one of the toggle clamps used in the invention; and Figure 10 is a perspective view of one of the chain guides used therein.

Like characters of reference are employed to designate like parts in the specification and throughout the several views.

Figure 1:
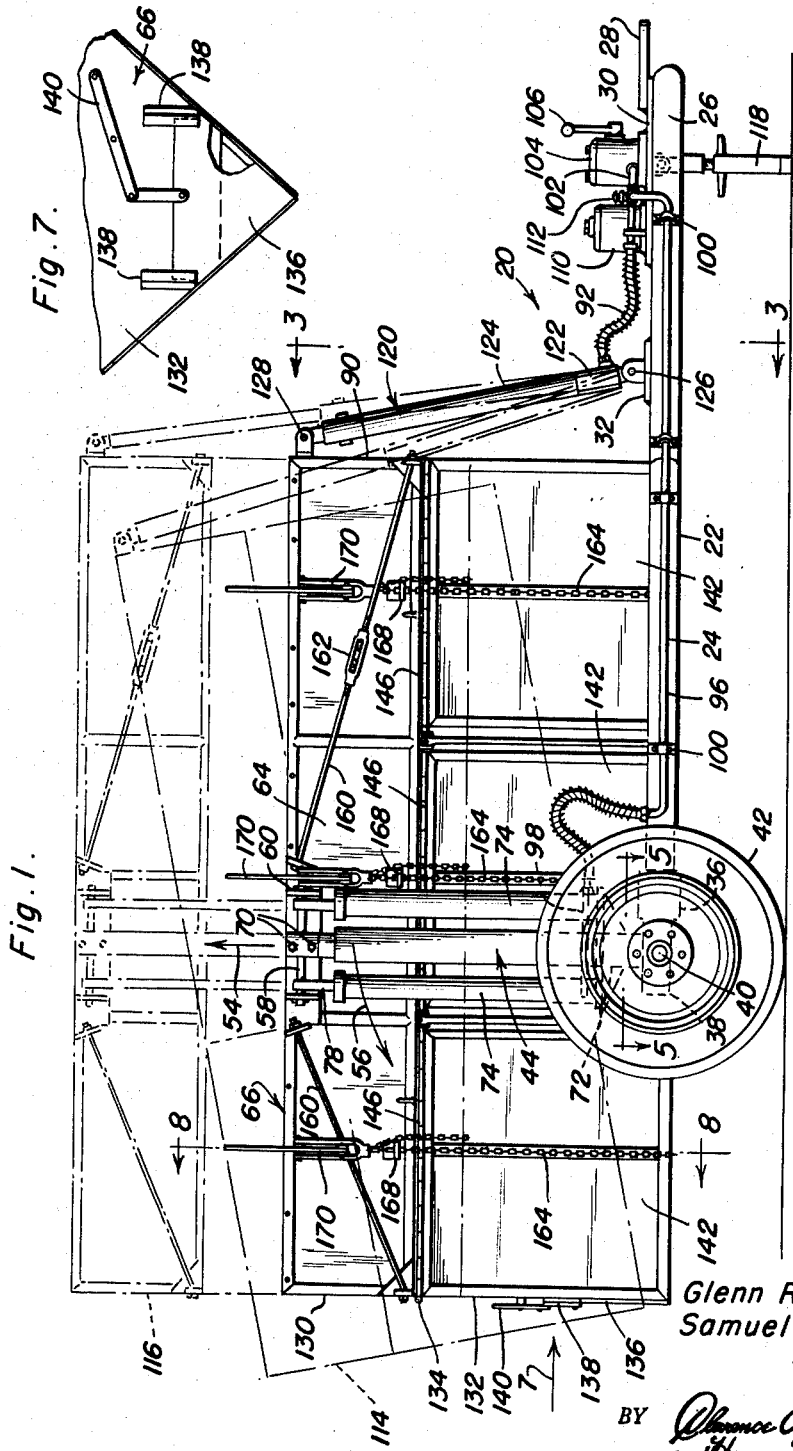
Figure 1 is a side elevational view of the invention.

Referring now to the accompanying drawings in detail, the invention consists of a dump trailer designated generally by the reference character 20, the same embodying in its construction a frame 22 including a pair of spaced parallel side members 24 formed from tubular material, forward continuations of these side members being mutually convergent as shown at 26 and being provided at the "apex" thereof with a suitable hitch 28.

Figure 2:
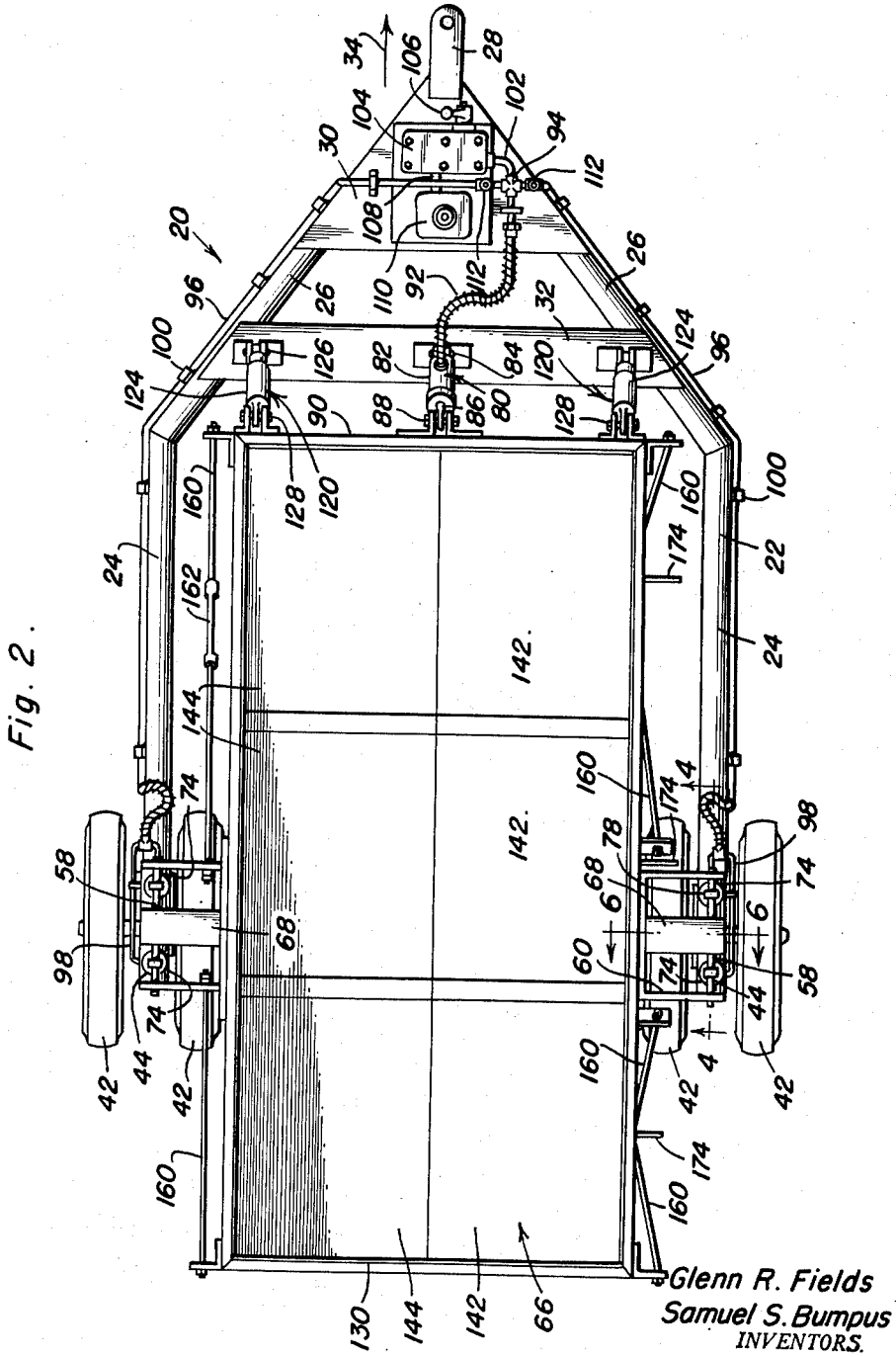
Figure 2 is a top plan view thereof.

A substantially triangular base plate 30 is secured to the frame portions 26 and a cross member 32 is also secured to these frame portions, as is best shown in Figure 2. Needless to say, the trailer is intended to travel forwardly in the direction of the arrow 34 in Figure 2, the hitch 28 being at the front end of the trailer, as will be clearly apparent.

The rear end portions of the frame members 24 carry rigidly mounted tubular sleeves 36 (see Figures 4 and 5) which, in turn, are equipped with bifurcated, rearward extensions 38. Transverse axle shafts 40 are journaled in these bifurcated extensions and each axle shaft carries a pair of traveling wheels 42. As is best shown in Figure 3, the traveling wheels in each pair straddle one of the frame side members 24, and a pair of upwardly extensible, rearwardly tiltable body supporting members designated generally by the reference character 44 are mounted on the shaft 40, as will be presently described.

Each of the supporting members 44 embodies in its construction a pair of tubular, slidably telescoped sections 46, 48 (see Figure 4), the section 46 having a lower end portion secured as at 50 to an adapter 52 which is pivotally mounted on one of the axle shafts 40, being disposed between and straddled by the furcations 38 of the associated sleeves 36 as is best shown in Figures 4 and 5. It is to be noted that by virtue of this arrangement, the sections 46, 48 may be slid outwardly, that is, upwardly, as indicated at 54 in Figure 4, while at the same time, the entire member 44 may be tilted rearwardly, as at 56 (see also Figure 1).

Upper end portions of the sections 48 of the two supporting members 44 are provided with transverse rods 58 which are rotatably journaled in the side portions of U-shaped brackets 60, the latter being rigidly secured as at 62 to the side walls 64 of the trailer body designated generally by the reference character 66. The attachment 62 of the brackets 60 to the body walls 64 is best shown in Figure 6, and it will be also noted that the brackets 60 include angulated intermediate portions 68 which are secured to the upper ends of the member sections 48 as at 70.

The aforementioned adapters 52 of the supporting members 44 are provided with pairs of laterally projecting brackets 72, these carrying pairs of hydraulic cylinders 74 equipped with pistons 76 and reciprocable piston rods 78 as detailed in Figure 4. Upper end portions of the piston rods 78 are operatively connected to the aforementioned rods or bars 58, so that when liquid under pressure is admitted into the cylinders 74, the rods 78, through the medium of the bars or rods 58, cause the support sections 48 to travel upwardly as at 54, thus lifting or hoisting the trailer body 66 therewith. It should be understood that the cylinders 74 are of the "single acting" type, lowering of the body 66 being effected by gravity after liquid is permitted to flow outwardly from the hydraulic cylinders.

A tilting member designated generally by the reference character 80 is provided at the forward portion of the trailer, this tilting member assuming the form of a hydraulic cylinder 82 pivoted as at 84 to the aforementioned cross member 32 of the frame 22, the cylinder 82 being equipped with a reciprocable piston 86 which is pivotally connected as at 88 to the front end wall 90 of the trailer body 66.

As is best shown in Figure 2, the cylinder 82 is operatively connected by means of a hydraulic line 92 to a coupling 94, this coupling also being connected by further hydraulic lines 96, 98 to the two hydraulic cylinders 74 at each side of the trailer body. That is to say, the hydraulic lines 96 extend from the coupling 94 to the front hydraulic cylinders 74 in each set, while the lines 98 connect the lines 96 to the rear hydraulic cylinders in each set, substantially as shown. Suitable clips 100 are employed for securing the lines 96 to the frame 22, and it will be also noted that the coupling 94 is connected as at 102 to a hydraulic pump 104 actuated manually by means of an oscillatory handle 106. The pump 104 communicates as at 108 with a hydraulic fluid reservoir 110, the pump as well as the reservoir being mounted on the aforementioned base plate 30 of the frame 22.

Shut-off valves 112 are provided in the aforementioned lines 96, so that when these valves are closed, only the cylinder 82 will be energized by actuation of the pump 104. However, when the valves 112 are open, the cylinder 82 as well as the cylinders 74 will be energized concurrently upon manipulation of the hydraulic pump.

As a result, if the cylinder 82 is actuated per se, the body 66 will be tilted in the direction of the arrow 56 to a position shown by the phantom lines 114 in Figure 1, this being facilitated by the pivotal mounting of the supporting members 44 on the axle shafts 40. However, when the cylinder 82 is actuated simultaneously with the cylinders 74, the entire body 66 will be lifted in a vertical direction as shown at 54, to a position indicated by the phantom lines 116.

A suitable screw jack, or the like, indicated at 118, may be provided under the forward end portion of the frame 22 for the purpose of retaining the frame in a substantially horizontal position while the trailer is stationary, as will be clearly apparent (see Figure 1).

A pair of upwardly extensible guide members 120 are also provided at the forward end portion of the trailer at the sides of the tilting member 80, these guide members assuming the form of pairs of slidably telescoped sections 122, 124 which are pivoted to the cross member 32 and to the front end wall 90 of the body 66 as at 126 and 128, respectively. The purpose of these guide members is, of course, to provide lateral stabilization for the body 66 while the latter is being tilted or lifted, and it will be noted that the sections 122 of the members 120 are formed with rows of apertures 130 (see Figure 3) in which suitable pins (not shown) may be inserted for the purpose of retaining the members 120 in predetermined extended position and thereby preventing the body from being accidentally lowered from its elevated or tilted position.

Referring now to the construction of the trailer body 66 per se, the same includes the aforementioned side walls 64, connected together by the aforementioned front wall 90 and by a rear wall upper portion 130. A substantially triangular rear wall lower portion 132 is hinged to the portion 130 as at 134, the portion 132 constituting what may be referred to as a gate which may be swung rearwardly and outwardly upon tilting of the body to a position shown at 114 in Figure 1, so that the contents of the body may be effectively discharged. As is best shown in Figure 7, the rear wall portion or gate 132 is also provided with a relatively small, substantially triangular gate 136 which is upwardly slidable in suitable guides 138 provided on the portion 132, so that upon actuation of a suitable lever 140 operatively connected to the gate 136, the latter may be raised to effect discharge of the load in small quantities, without the necessity of opening the entire gate 132.

The actual bottom of the body 66 is constituted by downwardly and outwardly openable pairs of doors 142, 144 which are hinged as at 146, 148, respectively, to the lower edges of the side walls 64, as is best shown in Figure 8.

The doors 142, 144 are, of course, openable downwardly and outwardly as indicated at 150 in Figure 8, but when the doors are closed, they are downwardly convergent, so that they constitute the bottom of the body, as has been already pointed out. The doors 142, 144 are reinforced by tubular members 152, 154, while similar reinforcing members 158 are provided on the side walls 64 of the body 66, substantially as shown. Moreover, the side walls 64 are reinforced by suitable tie rods 160, provided with turnbuckles 162, as will be clearly apparent.

Means are provided for controlling the opening and closing of the doors 142, 144, these means comprising lengths of chain 164 which are anchored at one end to the doors 144 as at 166 (see Figure 8), these chains passing under the reinforcing members 152 at the lower edges of the doors 142, 144 and around the reinforcing members 146 of the doors 142, whereupon the chains 164 pass through suitable guides 168 secured to one side wall of the body. This side wall also carries a set of toggle clamp units 170 best shown in Figure 9, these being provided with chain tightening jaws 172 formed with recesses 174 to engage the links of the chains. The clamp units 170 also include actuating levers 174 matters being so arranged that when the levers 174 are moved upwardly to a position shown in Figure 8, the chains 164 are tightened by the jaws 172, being drawn in the direction of the arrow 176. The "toggle" action of the clamps 170, of course, prevents the chains 164 from becoming loose until the levers 174 are released, so that the clamps 170, in their locked position, will effectively retain the doors 142, 144 in their closed positions.

However, upon moving the levers 174 as shown at 178 in Figure 8, the chain 164 will be slackened and when the jaws 172 come in contact with the guides 168, the jaws will be released from the chain links and the chains will be automatically permitted to slide freely through the guides 168 thus, in turn, permitting the doors 142, 144 to become fully opened under the influence of gravity.

It is to be noted that the guides 168 are formed with cross shaped openings 180 to facilitate passage of the chains 164 therethrough, and if desired, suitable bolts, pins, or the like 182 may be provided in the free end portions of the chains 164 as shown in Figure 8, which pins, being unable to pass through the openings 180 of the guides 168, will function as effective stops for preventing the chains from sliding completely through the guides. It will be also noted that by selectively positioning these pins 182 in the links of the chains 164, the extent of opening of the doors 142, 144 may be varied, thus varying the rate of discharge of the load accordingly.

Apart from handling loose material such as grain, coal, stones, etc., the invention may also be employed for hauling logs, timber, poles, and the like, this being facilitated by suitably securing such logs, etc., to the body 66 and utilizing the hydraulic cylinders 74 for hoisting the body and the logs secured thereto, so that the logs clear the ground sufficiently for transportation purposes.

It is believed that the advantages and use of the invention will be clearly apparent from the foregoing disclosure and, accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

Extensible and tiltable supporting means for dump trailer bodies, comprising a telescopic support member including upper and lower sections slidably telescoped together, a transverse pivot pin extending through the lower end portion of the lower section for swingably connecting the support member to a trailer chassis, a pair of laterally projecting brackets secured to the lower section at opposite sides of the latter, a pair of hydraulic cylinders secured at one end thereof to the respective brackets, said cylinders having piston rods parallel to the longitudinal axis of said support member, a transverse shaft extending through the upper end portion of the upper section of the support member and having said piston rods connected thereto, and bracket means pivotally mounted on said shaft and adapted to be secured to a dump trailer body.

GLENN R. FIELDS.
SAMUEL S. BUMPUS.

REFERENCES CITED

The following references are of record in the file of this patent:

UNITED STATES PATENTS

| Number | Name | Date |
|---|---|---|
| 460,258 | Winter | Sept. 29, 1891 |
| 485,294 | McRoberts | Nov. 1, 1892 |
| 652,757 | Ege | July 3, 1900 |
| 751,455 | Bullock | Feb. 9, 1904 |
| 1,285,773 | Miller | Nov. 26, 1918 |
| 1,294,799 | Harvey | Feb. 18, 1919 |
| 1,377,611 | Albrecht et al. | May 10, 1921 |
| 1,429,974 | Rogers | Sept. 26, 1922 |
| 1,733,988 | Barnard | Oct. 29, 1929 |
| 1,891,922 | Eisenberg | Dec. 27, 1932 |
| 2,077,534 | Sell | Apr. 20, 1937 |
| 2,494,377 | Cresci | Jan. 10, 1950 |